J. D. & S. LEACH.
NAVIGATORS' PROTRACTOR.

No. 178,535.                    Patented June 13, 1876.

WITNESSES.
Eugene Humphrey
Samuel D. Kelley

INVENTOR.
Joseph D. Leach
Sewall Leach
By Porter & Hutchinson Attys

UNITED STATES PATENT OFFICE.

JOSEPH D. LEACH AND SEWALL LEACH, OF PENOBSCOT, MAINE.

IMPROVEMENT IN NAVIGATORS' PROTRACTORS.

Specification forming part of Letters Patent No. 178,535, dated June 13, 1876; application filed March 6, 1876.

*To all whom it may concern:*

Be it known that we, JOSEPH D. LEACH and SEWALL LEACH, both of Penobscot, in the State of Maine, have invented a Navigator's Protractor, of which the following is a specification:

The object of our invention is to furnish to master mariners a certain, positive, and reliable instrument, by the aid of which they may be able to demonstrate upon their charts the exact course, by compass, to be pursued from the port of departure to the port of arrival, or the direction, by compass, from the given position of the vessel to the port of arrival, or the direction, by compass, of any given point on the chart from any other point thereon, without the use of parallel rules or the instrument usually employed for such purpose; and the invention consists in combining, with a circular card subdivided and marked in the usual manner of compass-cards, with a straight-edge or rule, by means of a holder or socket for the straight-edge, such socket or holder being pivoted to the center of the card, and so constructed and arranged as that the line of one edge of the rule shall pass directly through the pivotal center of the socket and card.

Figure 1:
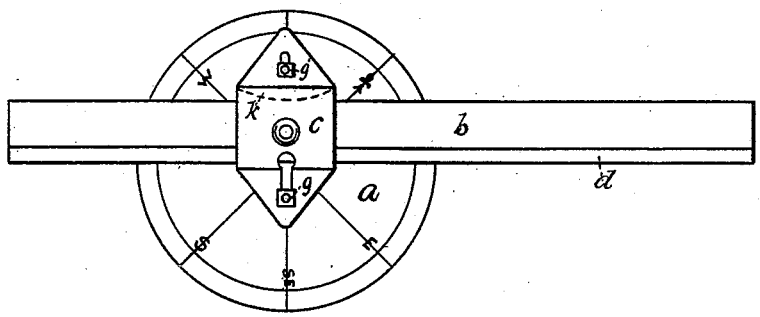
Figure 2:
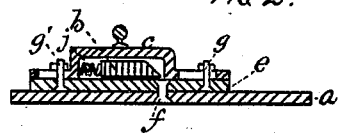
Figure 3:
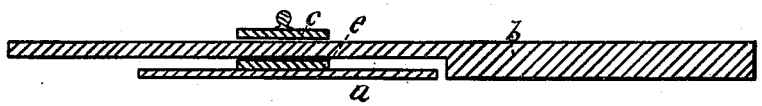
Figure 4:
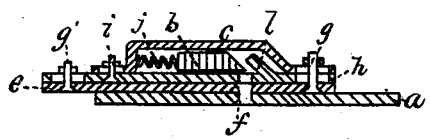

In the accompanying drawings, Figure 1 is a top or plan view of our protractor complete. Fig. 2 is a vertical section taken transverse to rule *b*. Fig. 3 is a vertical section taken in the axial line of rule *b*. Fig. 4 is a section similar to Fig. 2, but showing a modification of the rule or straight-edge holder.

In the above drawings, *a* represents the card. *b* is the straight-edge or rule. *c* represents the socket or holder. *d* is the beveled edge of the rule. *e* is the pivot-plate. *f* is the central pivot. *g* and *g'* are the locking-bolts. *h* is an intermediate plate between the pivot-plate *e* and the socket-plate *c*. *i* is an auxiliary locking-bolt, and *j* is a contact-spring.

The construction and operation of our invention will be readily understood by an examination of the drawings, with but a brief description.

The card *a* is to be subdivided to any desired degree of minuteness, and, as shown in Figs. 2 and 3, the plate *e* is pivoted to *a* by pivot *f*, so as to admit a free rotation of the parts relatively to each other. The bent or socketed plate *c* is secured to plate *e* by means of the screw-bolts *g* and *g'*, which are countersunk in plate *e*, and passed through slots in plate *c*, as is shown in Fig. 2. The rule or straight-edge *b* is diminished in thickness a part of its length by the amount of the thickness of card *a* and plate *e*, so that the under side of the thick part of the rule and the bottom of the card form a continuous line, to insure a perfect contact with the chart to prevent slipping. The thinner part of the rule passes through the passage in socket-plate *e*, sliding freely therein. The plate *e* is adjusted by means of screw-bolts *g* and *g'*, so that the edge of the rule will be exactly over the center of pivot *f*, and as the lines upon the card all radiate from such center, therefore the edge of the rule will coincide with such line, when brought in position.

A coiled spring, *j*, (shown in Figs. 2 and 4,) or a bent spring, *k*, (shown by dotted lines in Fig. 1,) serves to hold the rule in position relatively to the pivot *f*. In Fig. 4 the bolt *g'* serves to lock the plate *h* in proper position upon plate *e*, while bolt *g* locks both plates *c* and *h* to plate *e*. The bolt *i* serves to lock plate *c* to plate *h*.

The stops *l* may be formed as a part of plate *h*, and serve as a bearing for the beveled edge of the rule. A hole through plate *h* directly over the pivot *f*, as shown in Fig. 4, as also the slot in plate *c*, and the space between stops *l* in plate *h*, admit the accurate adjustment of the edge of the rule to the center of pivot *f*.

The practical use of this instrument may be described as follows: The beveled edge *d* of rule *b* being placed upon the two points whose relative directions it is desired to determine, the card *a* is then rotated and adjusted to such position that either the cardinal points north and south or east and west on the card shall coincide with a respective corresponding line on the chart, when the line on the card, coinciding with the edge *d* of the rule, would indicate the relative directions of such places from each other.

It will be apparent that if rule *b* were rigidly secured to the holder *c* the same result might be arrived at; but the double movement of the card—to wit, its rotation and end movement relatively to rule *b*—admits a more rapid adjustment, for when the rule is placed upon the two points, as stated, then, by means of such double movement of the card, two of its cardinal points can always be brought to coincide with a respective line on the chart.

We claim as our invention—

A navigator's protractor, consisting of the card *a*, subdivided and marked as a "compass-card," the rotary holder *c*, and rule *b*, the holder *c* being so pivoted to the center of card *a* at *f* as that one edge of rule *b* shall bisect pivot *f*, and the rule and holder being so constructed and arranged as to allow a lineal adjustment of the holder and card relatively to the rule, as well as a rotary adjustment of the card relatively thereto, all being constructed and arranged to operate substantially in manner and for the purposes specified.

JOSEPH D. LEACH.
SEWALL LEACH.

Witnesses:
ALBERT E. VARNUM,
CALVIN DAVIS.